United States Patent [19]

Almgren et al.

[11] Patent Number: 5,574,982
[45] Date of Patent: Nov. 12, 1996

[54] METHOD AND APPARATUS FOR REGULATING A POWER LEVEL OF A TRANSMITTED RADIO SIGNAL

[75] Inventors: Magnus K. Almgren, Sollentuna; Claes H. Andersson, Stockholm; Erik O. Grimlund, Hässelby, all of Sweden

[73] Assignee: Telefonaktiebolaget LM Ericsson, Stockholm, Sweden

[21] Appl. No.: 61,000

[22] Filed: May 14, 1993

[51] Int. Cl.$^6$ .................................................. H04B 17/00
[52] U.S. Cl. ............................................. 455/69; 455/67.1
[58] Field of Search ............................... 455/54.1, 54.2, 455/63, 67.1, 67.6, 69; 379/58–59; 375/1

[56] References Cited

U.S. PATENT DOCUMENTS

| | | |
|---|---|---|
| 3,678,390 | 7/1972 | Iwasaki et al. . |
| 3,808,539 | 4/1974 | Martin . |
| 4,317,083 | 2/1982 | Boyd . |
| 4,392,245 | 7/1983 | Mitama . |
| 4,485,486 | 11/1984 | Webb et al. . |
| 4,495,648 | 1/1985 | Giger . |
| 4,580,262 | 4/1986 | Naylor et al. . |
| 4,747,161 | 5/1988 | Hulsey et al. . |
| 4,811,421 | 3/1989 | Havel et al. . |
| 4,885,798 | 12/1989 | Jinich et al. . |
| 4,977,610 | 12/1990 | Kutz et al. . |
| 4,991,164 | 2/1991 | Casiraghi et al. . |
| 4,993,021 | 2/1991 | Nannicini et al. . |
| 4,998,289 | 3/1991 | Rabe et al. . |
| 5,025,208 | 6/1991 | Danzeisen . |
| 5,241,690 | 8/1993 | Larsson et al. . |
| 5,245,629 | 9/1993 | Hall ................................................. 375/1 |
| 5,265,119 | 11/1993 | Gilhousen et al. ........................ 455/69 |
| 5,278,992 | 1/1994 | Su et al. ...................................... 455/69 |
| 5,390,338 | 2/1995 | Bodin et al. ................................ 455/69 |

FOREIGN PATENT DOCUMENTS

| | | |
|---|---|---|
| WO93/07702 | 4/1993 | WIPO . |
| WO93/09626 | 5/1993 | WIPO . |

OTHER PUBLICATIONS

"CDMA Network Engineering Handbook", Chapter 8—Power Control, Nov. 23, 1992.

International Search Report, (PCT/ SE 94/00434), Date of Mailing of Search Report: Aug. 24, 1994.

J. Zander, "Optimum Power Control in Cellular Radio Systems," KTH, Report No. TRITA–TTT–9101, pp. 1–34 (Jan. 1991).

*Primary Examiner*—Andrew Faile
*Attorney, Agent, or Firm*—Burns, Doane, Swecker & Mathis, L.L.P.

[57] ABSTRACT

A method of and apparatus for stable regulation of transmission power level in a radio system use the carrier-to-interference (C/I) ratio of the communication channel. A C/I target that is a monotonically decreasing function of the interference on the channel is used for regulating the transmission power level. Thus, as the interference increases the transmission power increases to compensate, but to a level yielding a lower C/I level. The path loss or gain of the channel may also be determined and used in the regulation.

10 Claims, 5 Drawing Sheets

METHOD AND APPARATUS FOR REGULATING A POWER LEVEL OF A TRANSMITTED RADIO SIGNAL

BACKGROUND

The present invention relates to the use of transmission power regulation techniques in radio communications, and more particularly to a method of and system for regulating power, preferably based on the carrier to interference (C/I) ratio.

To minimize interference between communicators using a radio communication system, the power levels of the radio signals may be regulated. For example, interference between different call connections using the same radio channel in a mobile radiotelephone system might be reduced by regulating the transmission power levels of the mobile stations and base stations. The goal would be to ensure that only the transmission power necessary to maintain satisfactory call quality is used so that the likelihood of interference between calls using the same radio channel would be reduced.

In existing cellular systems, each cell is designed so that a minimal C/I ratio may be obtained in, for example, approximately 90% of the cell under normal traffic conditions. Without transmission power regulation, most of the calls in each cell's interior have a much better C/I than necessary and may cause calls at the peripheries of other cells to use higher transmission power levels in order for those calls to be heard clearly. In other words, the calls in the cell interiors create more interference than necessary without transmission power regulation.

Another advantage of power regulation for cellular telephone systems is that system capacity can be increased by approximately 70% as compared to an unregulated system, assuming the C/I ratio is the same for all calls. Another reason to maintain the power at the lowest possible level is to reduce the energy consumed by the mobile station. Accordingly, the batteries used to power portable mobile stations can have a smaller capacity with the result that the portable mobile stations can be made smaller.

In prior radiotelephone systems, for example as shown in Webb et al. U.S. Pat. No. 4,485,486, power regulation involves the base station measuring the signal strength of transmissions received from the mobile station, comparing the received signal strength with upper and lower thresholds that indicate a desired range for proper reception, and issuing a power adjustment order to the mobile station based on the comparison. The process is repeated at relatively infrequent intervals, typically on the order of once every five seconds, and the mobile's transmission power is controlled only coarsely. This type of control assumes that the disturbance level is more or less constant and tries to keep the received signal comfortably above this level. In practice, however, such power regulation is far from optimal because the disturbance level varies considerably with both time and place.

In the system described in Havel et al. U.S. Pat. No. 4,811,421, the mobile station calculates the transmission power level it should use in order for the strength of the signal received by the base station to be constant. The calculation is based on measurements of the signal strength received by the mobile station that it uses to estimate the path loss to the base station. Thus, the base station does not need to instruct the mobile station to adjust its transmission power. Nevertheless, the regulation is based on maintaining a constant received signal strength, and thus is similar to that disclosed in the patent to Webb et al.

As described in J. Zander, "Optimum Power Control in Cellular Radio Systems", KTH, Report No. TRITA-TTT-9101 (January 1991), for every traffic scenario in a cellular system there exists a maximal C/I ratio which can be obtained by all calls, such that all calls have this same C/I ratio. In a power regulating scheme, it is desirable to regulate power to obtain this maximal C/I value, but in practice it is difficult to determine the value to be targeted. If the value is set too high or too low, the powers of all regulated transmitters will be either increased to maximum levels or decreased to minimum levels, determined by the physical limits of the system.

This "party effect" is one of the problems that have been found in attempting to achieve a constant C/I ratio over an entire cell. For example, if two cells in different cell clusters use the same frequencies and have minimum allowed power levels which the mobiles in the respective cells can aim at and maximum power levels which those mobiles can not transmit above, an unstable system results. Mobiles located in a first cell raise their transmission power levels to overcome the cochannel interference caused by mobiles in the second cell and thus reach the constant C/I ratio. Similarly, the mobiles in the second cell raise their transmission power levels to overcome the now-increased cochannel interference from the mobiles in the first cell. Again, the mobiles in the first cell then adjust their power transmission levels upward. This effect continues until all mobiles in the first and second cells are transmitting at their maximum levels, resulting in no improvement in interference problems, as well as power consumption problems with battery-operated mobiles.

In the system described in Naylor et al. U.S. Pat. No. 4,580,262, the output power level of the transmitter is controlled by the receiver such that the output power is just enough for the link to have sufficient quality. Nevertheless, the quality target is fixed, and thus the system suffers from the "party effect" described above when two call connections use the same radio channel in such a way that they interfere with each other. Such cochannel interference situations are common in cellular radio telephone systems.

SUMMARY

Applicants' invention avoids the instability problems of prior communication systems and provides power regulation for up-link and/or down-link transmissions in such a way that received signal strength values and C/I ratio values are maintained closer to desired values than in known systems. In a radio communication system according to Applicants' invention, a system and method are provided for regulating the transmission power of a transmitting station. When Applicants' invention is embodied in a cellular radio system, the receiving station may be a mobile station and the transmitting station may be a base station or the receiving station may be a base station and the transmitting station may be a mobile station. Applicants' invention may also be embodied in non-mobile radio communication systems.

In one embodiment, a method of regulating transmission power includes the steps of receiving a signal transmitted at a known transmission power level by the transmitting station and measuring a quality criterion, such as a bit error rate (BER), associated with the received signal. Further, the method includes the steps of determining a new transmission power level based on the measured quality criterion and the known transmission power level and ordering the transmitting station to transmit at the new transmission power level. The method may further include the steps of measuring a received power level associated with the received signal and determining a path loss or gain of the channel based on the difference between the received power level and the known transmission power level. The new transmission power level is then determined based on the measured quality criterion, the known transmission power level, and the path loss.

A system in accordance with Applicants' invention includes means for receiving a signal transmitted at a known power level, means for measuring a received power level associated with the received signal, means for measuring a quality criterion associated with the received signal, means for determining a new transmission power level based on the measured quality criterion and known transmission power level, and means for ordering the transmitting station to transmit at the new transmission power level. The system may also include means for determining a path loss or gain based on the difference between the received power level and the known power level, and the path loss is also used in determining the new transmission power level.

BRIEF DESCRIPTION OF THE DRAWINGS

The features and advantages of Applicants' invention will be understood from reading this description in conjunction with the accompanying drawings, in which.

DETAILED DESCRIPTION

While the following description is in the context of cellular communication systems involving portable or mobile radio telephones and/or personal communication networks, it will be understood that Applicants' invention may be applied to other communication applications. For example, power regulation in accordance with Applicants' invention can be used advantageously in radio data communication systems and land mobile radio systems, as well as in non-mobile radio systems such as telephone systems employing radio in the local loops. Even the latter fixed links may be subject to time-varying disturbances that can be counteracted by power regulation in accordance with Applicants' invention.

Figure 1:
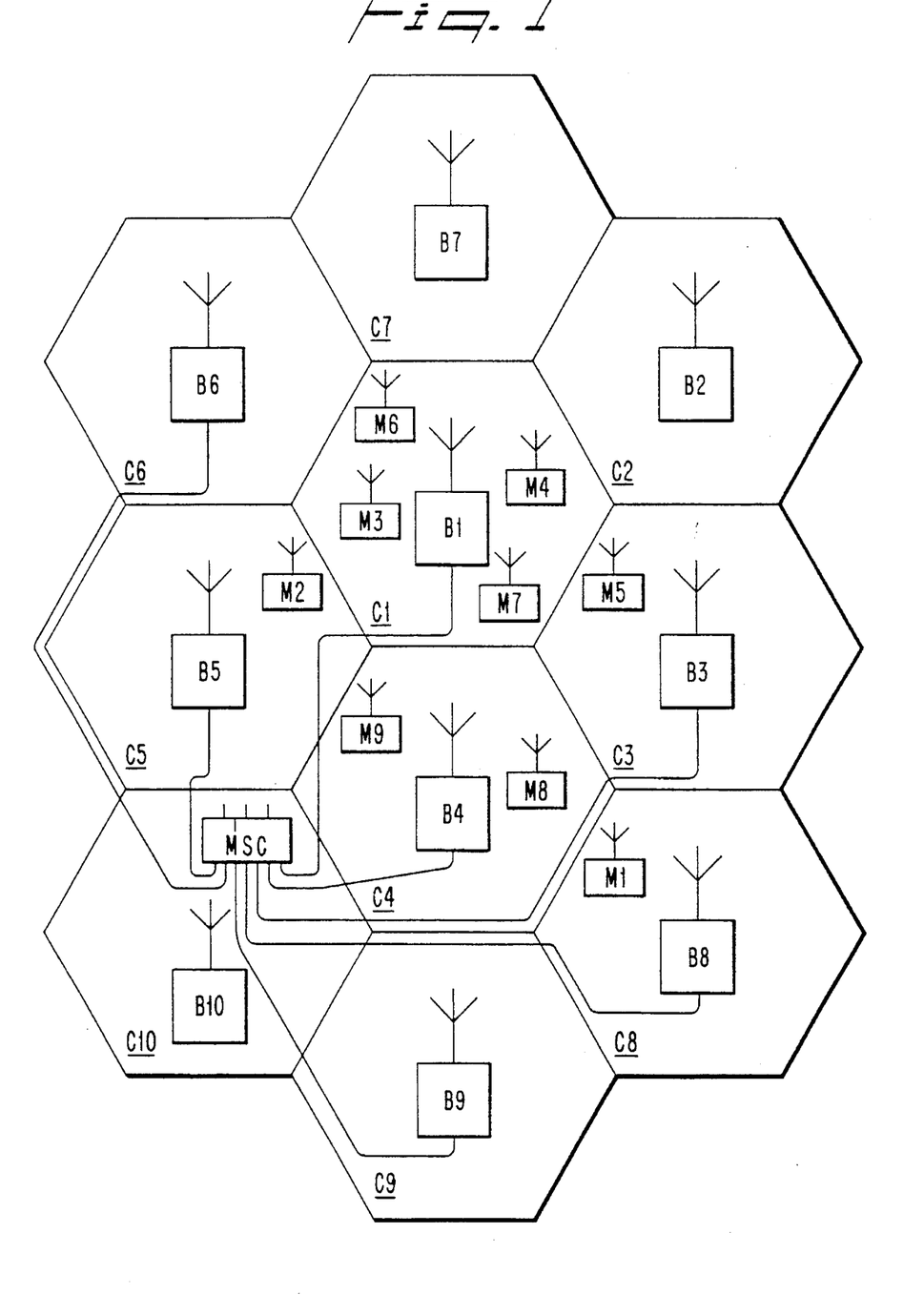
FIG. 1 illustrates various parts of a cellular mobile telephone system, including cells, a mobile services switching center, base stations and mobile stations.

FIG. 1 schematically illustrates ten cells, C1 to C10, in a cellular mobile radiotelephone system. The cells depicted should be considered as only a portion of the system that would normally have many more cells than ten. For each cell C1 to C10, there is a respective base station B1 to B10 that may be situated near the cell's center, and such base stations typically have omni-directional antennas. The base stations may, however, be situated proximate to the cell borders and have directional antennas.

FIG. 1 also illustrates nine mobile stations M1 to M9, which move within and between the cells and which represent only a portion of the mobile stations in the system. In particular, there are normally many more mobile stations than there are base stations. Also illustrated in FIG. 1 is a mobile services switching center (MSC). The MSC is shown connected to the base stations by cables, although other means for base-MSC communication may be used, e.g., fixed radio links and fiber optic links. The MSC is also connected to a public switched telephone network (PSTN) or similar network.

The system illustrated in FIG. 1 uses a plurality of radio channels for communicating analog information, e.g., speech, and/or digital information, e.g., digitized speech or data. To minimize interference between transmitting stations using the same radio channel, it is advantageous to regulate the transmitted power levels as described above. Using Applicants' power regulation scheme, the appropriate transmission power levels are determined either by the MSC (or, in the Global System for Mobile Communications (GSM), a base station controller (BSC)) in cooperation with the base stations or by the base stations alone. After receiving a signal from a mobile, the base station measures various parameters associated with the received signal to determine a transmission power order to be sent to the mobile station as described below. It will be understood that it is usually better for the MSC and/or base stations to control the necessary power regulation tasks, although in principle the mobile stations could also be used.

To overcome the problems described above and maintain a stable system, transmission power is regulated to attain a target C/I ratio that, in general, is a monotonically decreasing function of the interference level present on the channel and of the gain (negative path loss) involved in the transmission. Thus, Applicants' power regulation scheme does not involve a fixed target C/I ratio or a target received signal strength. On the other hand, it may be necessary to determine the interference level, and in the general case the path loss or gain of the channel, to find the appropriate target C/I ratio.

In the following, the interference level is designated by I when describing the C/I ratio, (traditional) and by i in the formulas, but they are equivalent. Parameters such as p, p', g, i, I, P, SS, $\alpha$, $\beta$, and C/I are advantageously used in the logarithmic form of dB. Thus, the gain g, which is derived from a difference between the received power level and the known transmission power level as described below, is given simply by a subtraction. It will be appreciated that the parameters may instead be used in their equivalent linear forms with appropriate adjustments to the formulas.

To determine the interference level i, a quality measurement, for example the BER or bit error content, is made by the receiving station in any of several ways known by those of ordinary skill in the art. In a typical time division multiple access radiotelephone system, e.g., according to the EIA/TIA IS-54-B standard, the synchronization word (SYNC) and/or the digital verification color code (DVCC) received by the receiving station can be compared with the known sequence or code transmitted. In this way, the amount of errors can be determined over time. From this BER value, the corresponding C/I ratio can be determined by using an empirical translation table as known in the art. Then, if the received signal strength SS is also measured, the interference i can be determined from the following relationship:

$$i=SS-C/I$$

where all of the parameters are in dB.

For the general case of Applicants' power regulation technique, the channel gain or path loss is readily determined from the difference between a connection's received power level (which can be measured) and its transmission power level (which can be known a priori). If those levels are measured in dB, simple subtraction yields the desired path loss.

Figure 2:
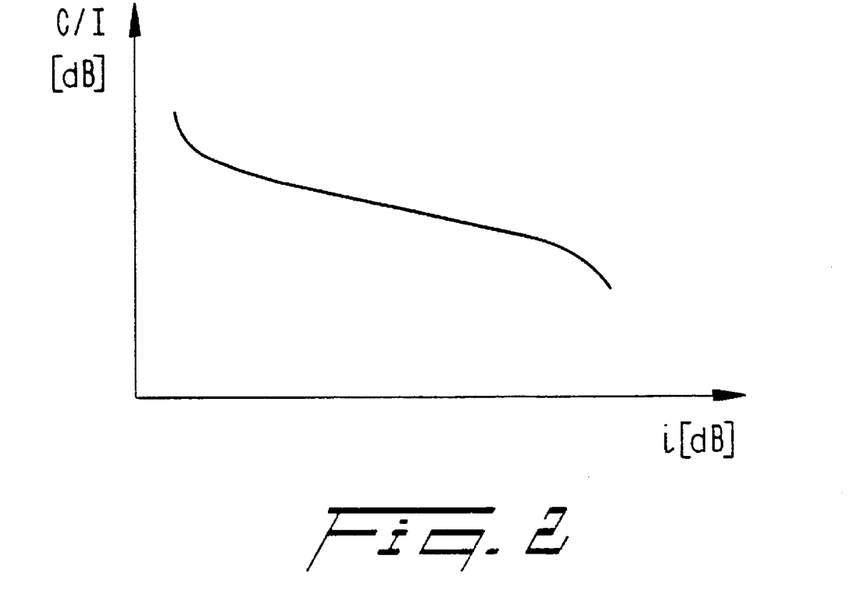
FIG. 2 is a graphical representation of a regulation function according to Applicants' invention.

An example of the proper functional relationship between the target C/I ratio and the interference level is shown in FIG. 2. It will be understood that as the interference increases, the transmission power increases to compensate, but from the figure the transmitting station will not aim at the same C/I ratio, but at a lower ratio. Since the increase in interference "seen" by other connections due to the power increase is then lower than it would have been for a power increase aimed at the "old" C/I ratio, the system can converge to a new, although lower, C/I ratio as the transmitters for those other connections increase their transmission powers. Any monotonically decreasing function may be appropriate, provided the function has a first derivative of the C/I target with respect to the interference that is in the range of about −2 to 0. This is needed for stability. It is also desirable for that derivative to be in the range of about −1 to 0 in order to increase capacity in the system. It now appears that a good value is about −0.3. Transmission power regulation in accordance with Applicants' invention produces a stable system having graceful degradation at higher traffic levels where the interference is higher and thus the C/I target will be lower.

The C/I target is advantageously also functionally related to the path loss or gain in the connection, and the shape of the relationship can be similar to that shown in FIG. 2. In particular, a monotonically decreasing function should be used, and the first derivative of the C/I target with respect to the gain is not critical but can be in the range of 0 to 1.

The following general relation exhibits the regulation principle of Applicants' invention. Regulation is performed periodically according to:

$$p=\alpha-\beta_g(g)+\beta_i(i)$$

where $0<d\beta_i/di<1$ for stability. In the foregoing general relation, p is the transmission power of the transmitting station; $\alpha$ is a predetermined constant; $\beta_g(g)$ is a predetermined function of the gain g in the connection (either up- or down-link); and $\beta_i(i)$ is a predetermined function of the interference power (disturbance) at the receiving station. The interference power is the sum of contributions from other call connections using the same channel. The origin of cochannel interference is irrelevant to the performance of Applicants' invention, although cochannel interference in a cellular system most often arises between transmitters in different cell clusters because frequency planning typically avoids same-cluster cochannel disturbances.

It will be understood from the foregoing general relation that Applicants' power regulation scheme is based in the general case on the particular connection's gain and interference level. The general relation indicates the steady-state condition but can be used in an iterative process to reach the steady state. It will be understood that the relationship shown in FIG. 2 (and FIG. 4) is a target function, i.e., it shows the values of C/I to aim in any situation. Iterations are needed to reach a final state on the curve because a change in transmission power influences C/I which in turn requires further adjustment of the transmission power. To regulate the power of a transmitting station, it is necessary to determine the parameters in the general relation. The transmitting station is then ordered in any suitable way by the receiving station to transmit at the desired transmission power level.

The constant $\alpha$ represents a predetermined acceptable power level at a particular distance. Specifically, $\alpha$ is adjusted so that at a predefined distance interference dominates over noise in most of the links; at that power level, the system enjoys reasonable quality. The constant $\alpha$ affects only the average transmission power and not the capacity in an environment where interference dominates over the random noise level, i.e., in an interference-limited system. As one example, $\alpha$ may be set at the maximum acceptable interference level.

Good performance regarding system capacity can be obtained when the functions of the gain and interference are as follows:

$$\beta_g(g)=0.7 \cdot g \quad \beta_i(i)=0.7 \cdot i$$

Figure 3A:
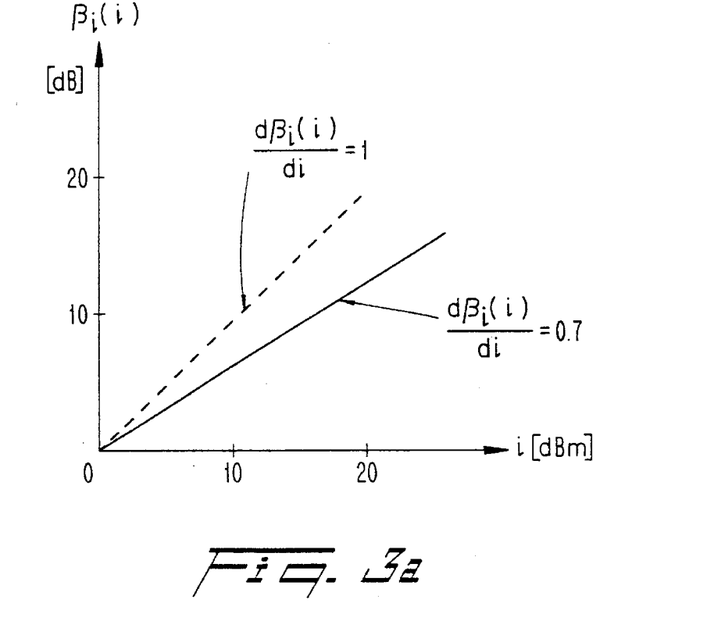
FIG. 3a is a graphical representation of a function of the interference power at the receiving station that may be employed in systems and methods in accordance with Applicants' invention.
Figure 3B:
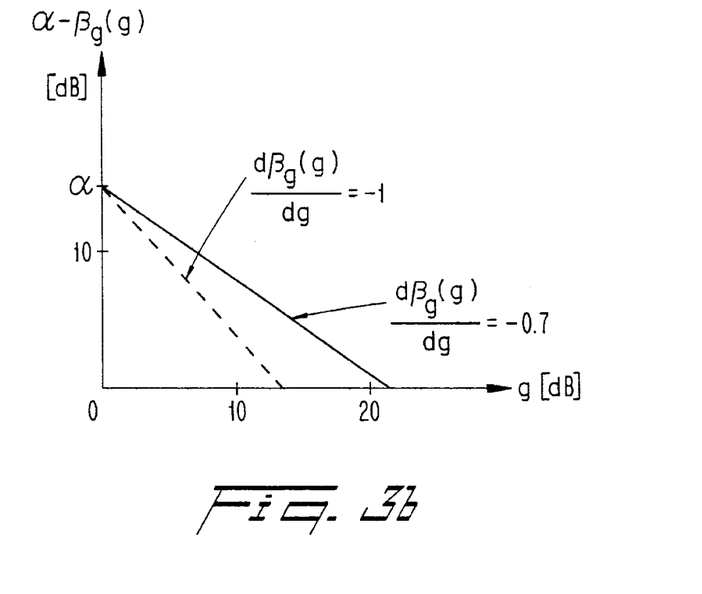
FIG. 3b is a graphical representation of a function of the path loss or gain in the link between the transmitter and receiver that may be employed in systems and methods in accordance with Applicants' invention.

Other functions of g and i can be used, including non-linear ones, but the slope of the function of i must be less than 1 for stability as noted above. The slope of the function of g is currently preferred to be between 0.5 and 1. Graphical representations of useful $\beta_i(i)$ and $\beta_g(g)$ are depicted in FIGS. 3a and 3b.

It will be seen from the foregoing general relation that a call suffering an increased interference level will be given a higher transmission power level but one associated with a C/I ratio less than the C/I ratio associated with the previous lower transmission power level. If it were otherwise, the problems of the prior systems where the transmitting stations transmit at the maximum allowable power level (the "party effect") would occur. Also, the transmission power level p will be decreased when the desired received signal strength is exceeded, for example, when a mobile station moves toward its base station (see FIG. 3b). As the path loss decreases and the gain increases, the system effectively moves to the right in FIG. 3b, thereby reducing the value of $\alpha-\beta_g(g)$, which results in a lower transmission power p at the next iteration.

An embodiment of Applicants' invention in accordance with FIG. 2 takes into account only the disturbance level. Thus, if the disturbance level does not change while a mobile station changes its distance from the base station, the transmission power level is changed such that the received C/I ratio does not change. In other words, full compensation is provided for gain changes (i.e., $d\beta_g/dg=1$) but less than full compensation is provided for disturbance level changes (i.e., $d\beta_i/di<1$).

Figure 4:
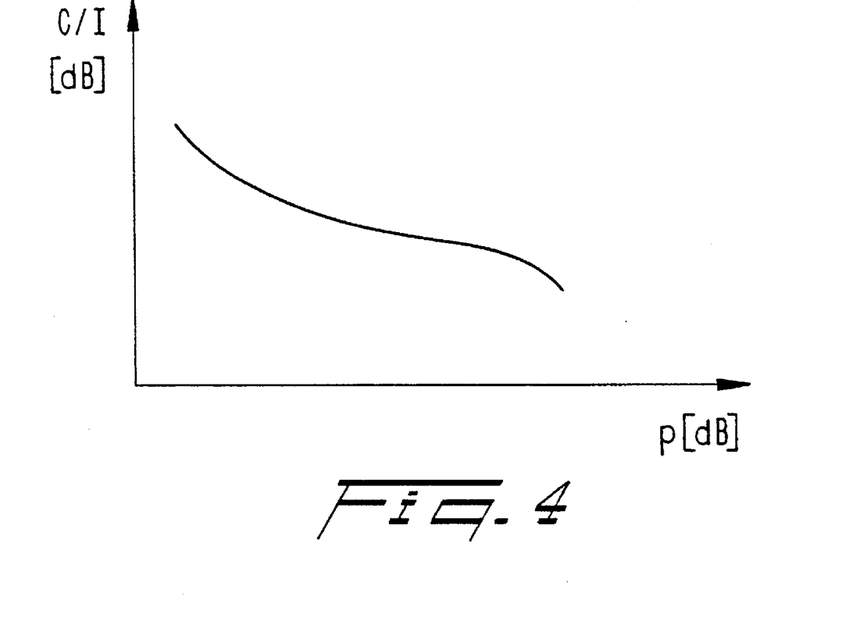
FIG. 4 is a graphical representation of another regulation function according to Applicants' invention.

Alternatively, an embodiment of Applicants' invention in accordance with FIG. 4, which shows the C/I target ratio as a monotonically decreasing function of the transmitted power level, takes into account the present transmission power level. Such an embodiment is simpler than one using FIG. 2 because a determination of the value of the disturbance level i is unnecessary. On the other hand, an embodiment using FIG. 4 provides less than full compensation not only for changes in disturbance level (which is necessary for stability) but also for changes in "radio distance" between the mobile and base stations (which is not necessary for stability). Since this is usually acceptable, the simpler embodiment in accordance with FIG. 4 may be preferred over an embodiment in accordance with FIG. 2.

The foregoing general relation can be used iteratively to converge to the optimal transmission power level and to accommodate temporal variations in gain and/or interference level. It is currently preferred that the transmission power level be updated about every 0.5 second. In an embodiment where $\beta_g(g)$ and $\beta_i(i)$ are linear as above, the next period's transmission power, p', can be represented generally by the following scalar expression:

$$p' = \alpha - \beta \cdot ((\Delta \cdot g) - i)$$

where $\Delta$ is between 0 and 1, and $\beta$, which is the slope of both $\beta_g(g)$ and $\beta_i(i)$, is between 0 and 1 for stability. For $\Delta=1$, this becomes:

$$p' = \alpha - \beta \cdot (g - i)$$

where the parameters $\alpha$, p', g and i are conveniently in dB, as are the parameters p and C/I in the following expressions. However, since:

$$C/I = p + g - i$$

for a connection in an interference-limited system, then the next period's transmission power is given by the following expression of known parameters:

$$p' = \alpha - \beta \cdot (C/I - p)$$

where p is the current period's transmission power. When the system has achieved a steady state, i.e., when p'=p, then:

$$p = \alpha/(1-\beta) - (\beta/(1-\beta)) \cdot C/I$$

from which the steady-state C/I and transmission power level when $\beta=0.7$ are given by the following expression:

$$p = \alpha/0.3 - (07/03) \cdot C/I$$

where the C/I ratio is determined from a signal quality parameter, such as the BER as described above.

The transmission power level increases by 2.3 dB when the interference level increases by 1 dB. Other users experience increased interference, and act in the same way in response to the disturbance. After a period, the system settles to a steady-state in which the final decrease in C/I ratio is less than 1 dB because some of the increased interference has been compensated by the increased transmission powers. If the transmission power had been increased to reach the previous C/I ratio and the other users had done the same, transmission power would have increased progressively until the maximum was reached. On the other hand, if the transmission power had not been increased at all, the connection's C/I ratio would have decreased by 1 dB.

If the quality of some calls is to be reduced in a system, it preferably should be the quality of those calls causing interference rather than of calls suffering from it. An exemplary regulation curve for such a system is shown in FIG. 4 where the C/I target is a function of the transmission power used for the connection. For a given traffic situation in a system regulating power according to FIG. 4, the quality of calls at the border of a cell will likely be lower than the quality of calls at the cell interior. Also, the C/I ratio for calls in the interior of the cell for the power-regulated system is lower than the C/I ratio for such calls for an unregulated system, otherwise no improvement would be made. An advantage of power regulation according to FIG. 4 is its relatively easier implementation because the target C/I ratio depends only on the transmission power, which is known, and determination of the disturbance level i is not required.

Figure 5:
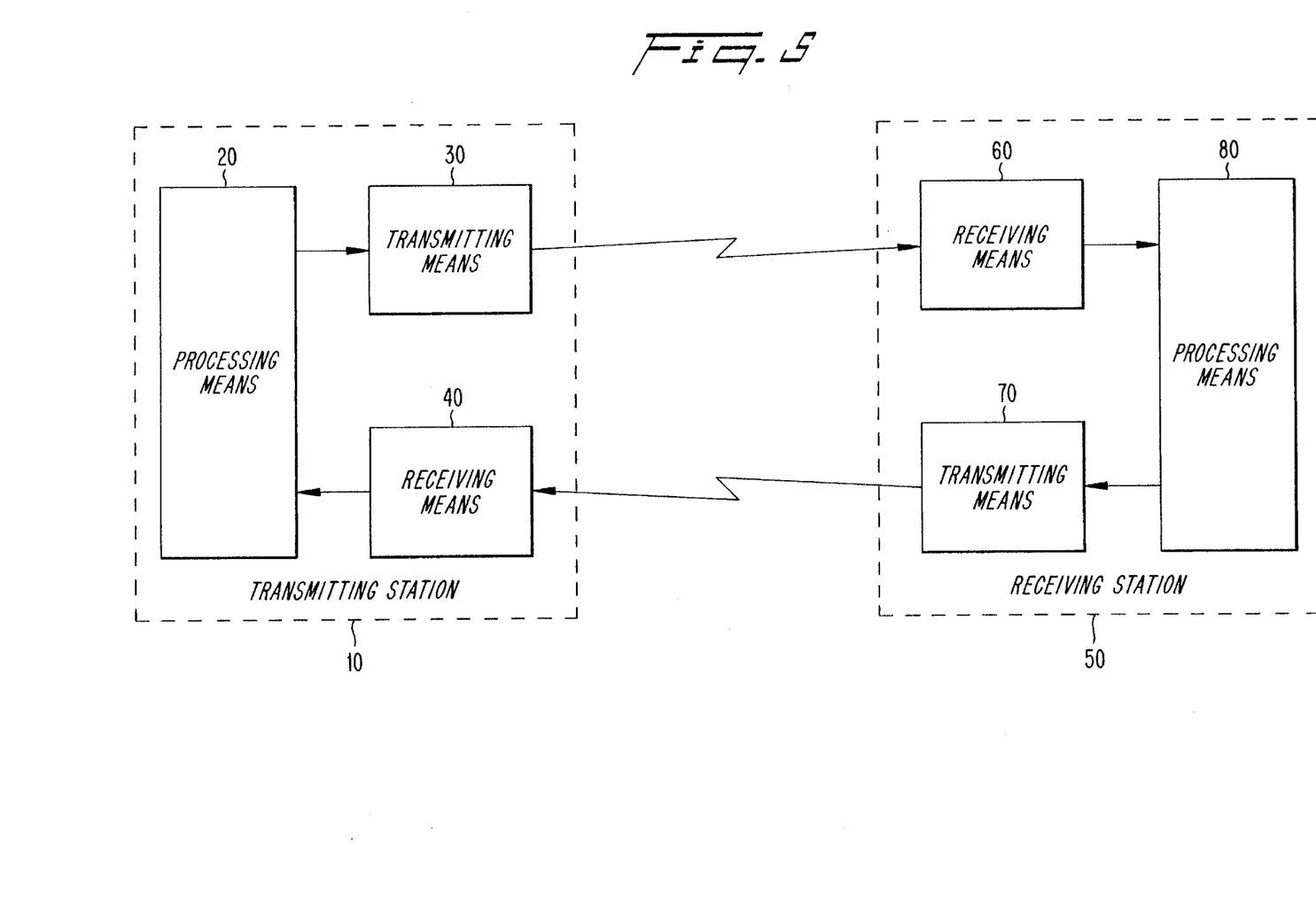
FIG. 5 is a block diagram of an exemplary system for performing power regulation in accordance with Applicants' invention.

An exemplary system in accordance with Applicants' invention is illustrated in FIG. 5. This system is similar to the system disclosed in commonly assigned U.S. patent application Ser. No. 941,307, filed Sep. 4, 1992, which is herein incorporated by reference. A transmitting station 10 has a means 30 for transmitting radio signals to a receiving station 50 that has a means 60 for receiving the radio signals and measuring their power level. The receiving means 60 also determines the channel path loss or gain and the quality of the received signals, including the C/I ratio, as described above. A method of measuring the interference level i during periods of silence is disclosed in commonly assigned U.S. Pat. No. 5,355,514, which is herein incorporated by reference.

Suitable data signals reflecting the received signal strength and quality measurements are provided by the receiving means 60 to a signal processor 80, which determines the new transmission power level or new C/I target value in a manner described above. The processor 80 then provides a suitable command signal to a transmitter 70 in the receiving station 50; the transmitter 70 sends the command signal to the transmitting station 10, ordering the transmitting station 10 to transmit at the new transmission power level associated with the new C/I target value. A means 40 for receiving the order forwards the order to a suitable processor 20, which causes the transmitting means 30 to transmit at the new transmission power level associated with the new C/I target value.

Figure 6:
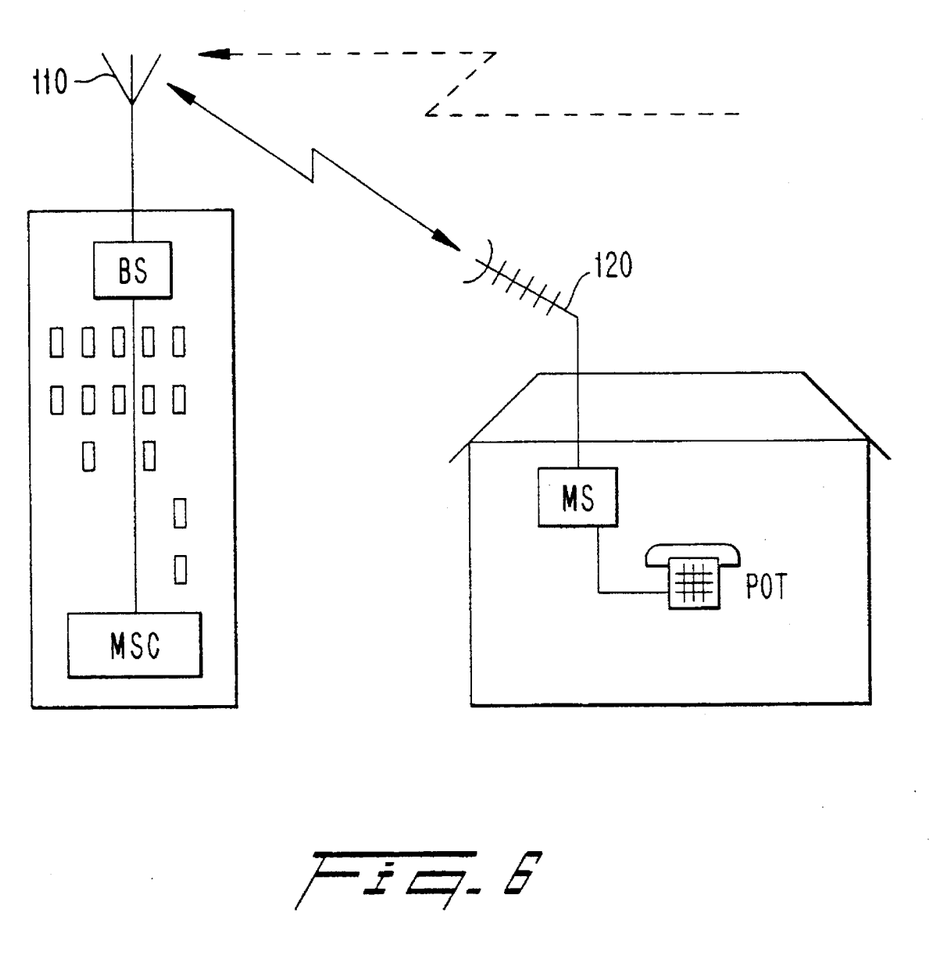
FIG. 6 illustrates various parts of a telephone system employing radio in a local loop.

Applicants' power regulation scheme is also applicable to a fixed radio communication system such as a telephone system that uses cellular radio in the local loops. Such a fixed radio system is illustrated in FIG. 6, which shows a mobile services center MSC connected to a base station BS. The MSC and BS are illustrated as being in the same building but this is not necessary. The BS sends and receives radio signals through an antenna 110, which is normally omni-directional. Signals sent by the BS are collected by the system subscriber's antenna 120, which is normally directional because it is fixed with respect to the base station BS. The subscriber's antenna 120 is connected to a "mobile station" MS that represents suitable components for making and receiving cellular telephone calls. These components are appropriately connected to the subscriber's standard telephone set POT in such a way that the use of the radio connection is transparent to the subscriber. The dashed wavy arrow represents interference signals that are due to other users of the radio channel.

Since the gain is substantially constant for the system shown in FIG. 6, Applicants' power regulation scheme can be applied in the system according to the expression:

$$p' = \alpha - \beta \cdot (C/I - p)$$

that was described above. Power control can be applied to uplink and/or downlink transmissions as described above.

It will be appreciated that a disturbance might be so severe that power regulation as described here might be insufficient to maintain a sufficient C/I ratio. In that event, the affected connection could be handed over to another available channel, e.g., frequency and time slot, in the same cell that would provide a better C/I ratio.

Applicants' power regulation scheme can also be combined with schemes for dynamic channel allocation (DCA) in radiotelephone systems, such as that described in commonly assigned U.S. patent application Ser. No. 872,232, filed Apr. 22, 1992. In such a combination, DCA would remove the need for frequency planning and the present power regulation would give the capacity increase that is difficult to realize from DCA's reuse partitioning. The least-interfered channel would be allocated in the combination. Also, there could be a maximal interference level that the least-interfered channel could have in order to accept a new call. This blocking level could be different for different situations, e.g., call set-up and handover.

While particular embodiments of Applicants' invention have been described and illustrated, it should be understood that their invention is not limited thereto since it is expected that modifications may be made by persons skilled in the art. Any and all modifications that fall within the spirit and scope of the invention as described and claimed herein are intended to be included therein.

What is claimed is:

1. In a radio communication system having a plurality of transmitting stations, a method of regulating a power level of a radio signal transmitted through a channel from a transmitting station to a receiving station comprising the steps of:

receiving the radio signal, the radio signal being transmitted at a known transmission power level by the transmitting station;

measuring a quality criterion associated with the received signal that was transmitted at the known transmission power level;

determining a new transmission power level for the transmitting station based on the quality criterion and the known transmission power level, the new transmission power level being otherwise independent of transmission power levels of other transmitting stations; and ordering the transmitting station to transmit the radio signal at the new transmission power level;

wherein the new transmission power level is determined so that, when the new transmission power level is greater than the known transmission power level, the quality criterion associated with a received signal that was transmitted at the new transmission power level is worse than the quality criterion associated with the received signal that was transmitted at the known transmission power level.

2. The method of claim 1, wherein the transmitting station is a mobile station in a cellular telephone system.

3. In a radio communication system having a plurality of transmitting stations, a method of regulating a power level of a radio signal transmitted through a channel from a transmitting station to a receiving station comprising the steps of:

receiving the radio signal, the radio signal being transmitted at a known transmission power level by the transmitting station;

measuring a quality criterion associated with the received signal that was transmitted at the known transmission power level;

determining a new transmission power level for the transmitting station based on the quality criterion and the known transmission power level, the new transmission power level being otherwise independent of transmission power levels of other transmitting stations; and ordering the transmitting station to transmit the radio signal at the new transmission power level;

wherein the quality criterion is one of a bit error rate and a bit error content; and the new transmission power level is determined so that, when the new transmission power level is greater than the known transmission power level, the quality criterion associated with a received signal that was transmitted at the new transmission power level is worse than the quality criterion associated with the received signal that was transmitted at the known transmission power level.

4. In a radio communication system having a plurality of transmitting stations, a method of regulating a power level of a radio signal transmitted through a channel from a transmitting station to a receiving station comprising the steps of:

receiving the radio signal, the radio signal being transmitted at a known transmission power level by the transmitting station;

measuring a quality criterion associated with the received signal that was transmitted at the known transmission power level;

determining a new transmission power level for the transmitting station based on the quality criterion and the known transmission power level, the new transmission power level being otherwise independent of transmission power levels of other transmitting stations;

ordering the transmitting station to transmit the radio signal at the new transmission power level;

measuring a received power level associated with the received signal; and determining a channel gain based on the received power level and the known transmission power level;

wherein the new transmission power level is determined so that, when the new transmission power level is greater than the known transmission power level, the quality criterion associated with a received signal that was transmitted at the new transmission power level is worse than the quality criterion associated with the received signal that was transmitted at the known transmission power level.

5. The method of claim 4, wherein the transmitting station is a mobile station in a cellular telephone system.

6. An apparatus for regulating a transmission power level of a transmitting station in a radio communication system comprising:

means for receiving a radio signal transmitted at a known transmission power level by the transmitting station;

means for measuring a quality criterion associated with the received signal;

means for determining a new transmission power level for the transmitting station based on the quality criterion and the known transmission power level, the new transmission power level being otherwise independent of transmission power levels of other transmitting stations; and means for ordering the transmitting station to transmit at the new transmission power level;

wherein the determining means determines the new transmission power level so that, when the new transmission power level is greater than the known transmission power level, the quality criterion associated with a received signal transmitted at the new transmission power level is worse than the quality criterion associated with the received signal transmitted at the known transmission power level.

7. The apparatus of claim 6, wherein the transmitting station is a mobile station in a cellular telephone system.

8. An apparatus for regulating a transmission power level of a transmitting station in a radio communication system comprising:

means for receiving a radio signal transmitted at a known transmission power level by the transmitting station;

means for measuring a quality criterion associated with the received signal;

means for determining a new transmission power level for the transmitting station based on the quality criterion and the known transmission power level, the new transmission power level being otherwise independent of transmission power levels of other transmitting stations; and means for ordering the transmitting station to transmit at the new transmission power level;

wherein the quality criterion is one of a bit error rate and a bit error content; and the new transmission power level is determined so that, when the new transmission power level is greater than the known transmission power level, the quality criterion associated with a received signal that was transmitted at the new transmission power level is worse than the quality criterion associated with the received signal that was transmitted at the known transmission power level.

9. An apparatus for regulating a transmission power level of a transmitting station in a radio communication system comprising:

means for receiving a radio signal transmitted at a known transmission power level by the transmitting station;

means for measuring a quality criterion associated with the received signal;

means for determining a new transmission power level for the transmitting station based on the quality criterion and the known transmission power level, the new transmission power level being otherwise independent of transmission power levels of other transmitting stations;

means for ordering the transmitting station to transmit at the new transmission power level;

means for measuring a received power level associated with the received signal; and means for determining a channel gain based on the received power level and the known transmission power level;

wherein the new transmission power level is further based on the channel gain; and the determining means determines the new transmission power level so that, when the new transmission power level is greater than the known transmission power level, the quality criterion associated with a received signal transmitted at the new transmission power level is worse than the quality criterion associated with the received signal transmitted at the known transmission power level.

10. The apparatus of claim 9, wherein the transmitting station is a mobile station in a cellular telephone system.

* * * * *